(12) United States Patent  (10) Patent No.: US 7,975,466 B1
Rodgers                                              (45) Date of Patent:         Jul. 12, 2011

(54) EXHAUST NOZZLE FOR THRUST VECTORING

(75) Inventor: Leonard John Rodgers, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 07/816,268

(22) Filed: Dec. 26, 1991

(30) Foreign Application Priority Data

Feb. 19, 1991 (GB) .................................. 9103401.7

(51) Int. Cl.
*F02K 1/00* (2006.01)
(52) U.S. Cl. ................................ 60/228; 60/230; 60/232
(58) Field of Classification Search .................... 60/228, 60/230, 232; 239/265.39, 265.41, 265.19
See application file for complete search history.

(56) References Cited

U.S. PATENT DOCUMENTS

| | | | | |
|---|---|---|---|---|
| 4,128,208 A | * | 12/1978 | Ryan et al. | 239/265.39 |
| 4,456,178 A | * | 6/1984 | Jones et al. | 239/265.39 |
| 4,994,660 A | * | 2/1991 | Hauer | 239/265.39 |
| 5,039,014 A | * | 8/1991 | Lippmeier | 60/228 |
| 5,076,496 A | * | 12/1991 | Lippmeier | 239/265.41 |
| 5,082,182 A | * | 1/1992 | Bruchez et al. | 60/230 |
| 5,174,502 A | * | 12/1992 | Lippmeier et al. | 60/228 |

* cited by examiner

*Primary Examiner* — Christopher P Ellis
(74) *Attorney, Agent, or Firm* — Oliff & Berridge, PLC

(57) ABSTRACT

An exhaust nozzle (10) for a gas turbine engine is described for vectoring a flow of exhaust gases issuing therefrom at an angle to a centre line (8) of the engine. The exhaust nozzle (10) comprises a plurality of radially outer flaps (25) and radially inner flaps (26) which are circumferentially disposed around the engine. The radially outer flaps (25) and radially inner flaps (26) alternately overlap each other to define a path through which the exhaust gases flow. The radially outer flaps (25) can be moved asymmetrically about the engine centre line (8). The radially inner flaps (26) are maintained in sealing contact with the outer flaps (25) by the flow of exhaust gases passing therethrough. The radially inner flaps (26) are divided into a number of triangular sections (29) which renders the flaps (26) torsionally flexible so that they can twist along their lengths to maintain sealing contact with adjacent radially outer flaps (25) when the outer flaps (25) are moved asymmetrically.

6 Claims, 2 Drawing Sheets

EXHAUST NOZZLE FOR THRUST VECTORING

BACKGROUND OF THE INVENTION

The present invention relates to an exhaust nozzle for a gas turbine engine and in particular to an exhaust nozzle capable of vectoring a flow of exhaust gases issuing therefrom at an angle to the centre line of the engine.

Military aircraft often need to have a high rate of turn in situations where the aircraft control surfaces are inadequate. For this purpose it is desirable for the engine to be provided with a propulsion nozzle which can deflect the exhaust gases to give a thrust at an angle to the centre line of the engine.

A conventional exhaust nozzle for thrust vectoring comprises a convergent and divergent section. The convergent section of the nozzle defines at its downstream end a nozzle throat of variable diameter. The exhaust gases are accelerated through the nozzle throat to the divergent section which contains the high pressure gas generated by the accelerated exhaust gases. The divergent portion defines at its downstream end a nozzle exit. The convergent and divergent sections of the nozzle comprise a plurality of radially outer and radially inner flaps which are circumferentially disposed around the engine. The plurality of flaps are substantially rectangular and rigid and define a flow path through which the exhaust gases flow. The flow path for the exhaust gases is defined by the outer and inner flaps alternately overlapping each other. The outer flaps in the convergent and divergent sections of the nozzle are actuated positively to vary the nozzle throat and exit respectively. The inner flaps stay in contact with the outer flaps due to the outward gas pressure of the exhaust gases when the engine is operational. When the engine is not operational the inner flaps are kept in contact with the outer flaps by flexible spring retainers or other similar devices.

Actuation of the outer flaps may be provided by a number of actuators which act on the outer flaps either independently or via a unison ring. The actuators can act directly on the outer flaps or through an outer fairing. To obtain deflected thrust the outer flaps of the divergent section of the nozzle are actuated so as to move them asymmetrically with respect to the engine centre line. The outer flaps are moved differentially so that the outer flaps on one side of the nozzle move to a different angle than the outer flaps on the other side. In this way the thrust line can be moved up or down or side to side to control the pitch and yaw axis.

A problem with conventional convergent/divergent nozzles is that when the outer flaps in the divergent section are moved asymmetrically to take up different angles, the inner flaps are unable to stay in contact with adjacent outer flaps. The inner flaps are therefore unable to seal against the outer flaps and leakage of the exhaust gases can occur.

SUMMARY OF THE INVENTION

The present invention seeks to provide an exhaust nozzle in which the inner flaps remain in sealing contact with the outer flaps when the outer flaps are moved asymmetrically.

The present invention is directed to an exhaust nozzle for a gas turbine engine capable of vectoring a flow of exhaust gases issuing therefrom at an angle to the centre line of the engine. The exhaust nozzle comprises a plurality of radially outer and radially inner flaps circumferentially disposed around the engine. The radially outer and radially inner flaps alternately overlap each other to define a flow path through which the exhaust gases flow, the radially outer flaps being provided with means for moving the flaps asymmetrically about the engine centre line, the radially inner flaps being urged into sealing contact with the radially outer flaps by the exhaust gas flowing through the nozzle, the radially inner flaps being torsionally flexible along their length so as to allow them to twist so as to maintain sealing contact with the radially outer flaps when the radially outer flaps are moved asymmetrically.

Preferably each of the radially inner flaps is divided into a plurality of triangular sections so it is torsionally flexible along its length. The triangular sections of the radially inner flaps may be interconnected by hinges.

The radially outer flaps are preferably moved asymmetrically with respect to the engine centre line by linear actuators pivotally connected to the radially outer flaps. The radially outer flaps may be moved asymmetrically with respect to the engine centre line by linear actuators which are connected to the flaps by a unison ring. In one embodiment of the present invention each of the radially outer and radially inner flaps has a convergent and divergent section. The convergent and divergent portions of the radially outer and radially inner flaps may be joined together by hinges.

BRIEF DESCRIPTION OF THE DRAWINGS

The nozzle may be provided with an outer fairing.

The present invention will now be described by way of example and with reference to the accompanying drawings in which.

DESCRIPTION OF THE PREFERRED EMBODIMENTS

Figure 1:
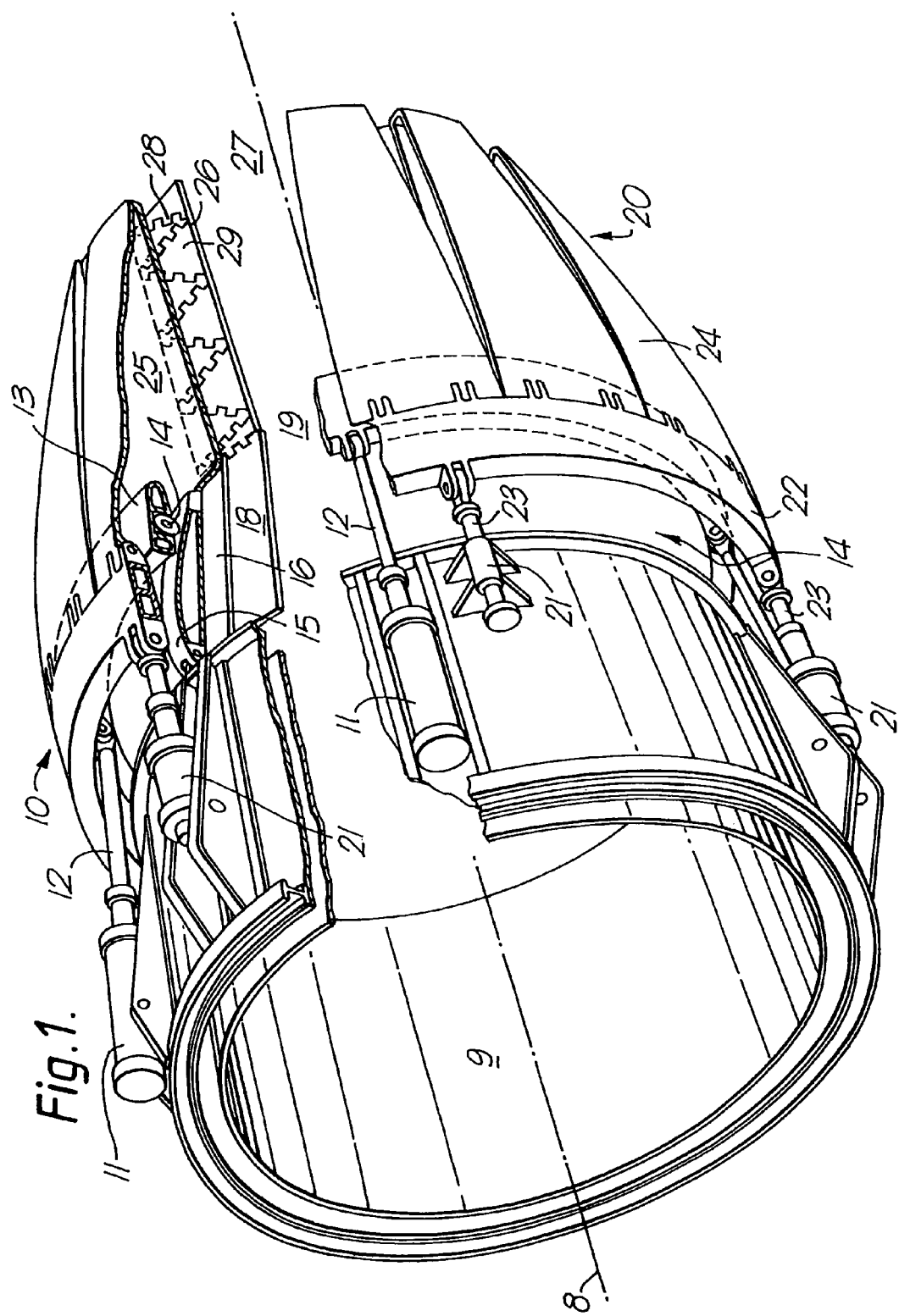
FIG. 1 is a partially cut away pictorial view of an exhaust nozzle in accordance with the present invention.

Referring td FIG. 1 an exhaust nozzle, generally indicated at 10, is in series flow relationship with a fixed area duct 9. The exhaust nozzle 10 comprises a convergent section 14 and a divergent section 20. The convergent section 14 and the divergent section 20 are each formed from a plurality of radially outer flaps, 16 and 25 respectively, and inner flaps, 18 and 26 respectively, which are circumferentially disposed around the engine. The outer flaps 16 and inner flaps 18 of the convergent section 14 define at their downstream ends a throat 19 the area of which can be varied. The outer 25 and inner 26 flaps of the divergent section 20 define at their downstream ends an exit 27 of the nozzle 10 through which the engine efflux flows. The outer flaps 25 and inner flaps 26 of the divergent section 20 can move asymmetrically with respect to the engine cenre line 8 to deflect the engine efflux issuing therefrom at an angle to the engine centre line 8.

The radially outer flaps 16 and inner flaps 18 of the convergent section 14 are substantially rectangular, and by overlapping alternate outer flaps 16 and inner flaps 18 a complete cone is formed. The downstream ends of the outer flaps 16 and inner flaps 18 in the convergent section 14 define the nozzle throat 19. The outer flaps 16 of the convergent section 14 are actuated positively to vary the diameter of the throat 19. The outer flaps 16 are actuated by linear actuators 11 which are connected to a unison ring 13. The linear actuators 11 are equally spaced around the fixed area duct 9 and may be hydraulic or pneumatic. When activated the linear actuators 11 cause rods 12 to translate the unison ring 13. The unison ring 13 translates to move a roller 14 along a cam 15 which causes the outer flaps 16 to pivot changing the area of the nozzle throat 19.

Although pivoting of the outer flaps 16 to control the area of the nozzle throat 19 has been described by way of the unison ring 13 moving a roller 14 along a cam 15, it will be appreciated that any mechanisms which are well known in the art could be used for this purpose.

The inner flaps 18 of the convergent section 14 are not actuated positively but stay in contact with the outer flaps 16 because of the outward pressure of the exhaust gases flowing through the nozzle 10. When the engine is not operational the inner flaps 18 are kept in contact with the outer flaps 16 by flexible spring retainers 30 or other similar devices. The width and number of inner flaps 18 used is chosen to give sufficient overlap without the edges meeting at the minimum throat area or separating too far to make a gap for the exhaust flow to escape.

The exhaust gases are accelerated through the throat area 19 and pass through the divergent section 20. The divergent section 20 is configured in the same way as the convergent section 14, there being a plurality of radially outer flaps 25 and inner flaps 26 circumferentially disposed around the engine. The outer flaps 25 and inner flaps 26 of the divergent section 20 are hinged from the ends of the outer flaps 16 and inner flaps 18 respectively of the convergent section 14. The outer flaps 25 of the divergent section 20 are positively actuated. The inner flaps 26 are maintained in sealing contact with the outer flaps 25 by the outward pressure of the exhaust gases passing therethrough. The outer flaps 25 of the divergent section 20 are actuated by a number of linear actuators 21 which are connected to a unison ring 22. The linear actuators 21 may be pneumatic or hydraulic and move the unison ring 22 via rods 23 further on one side than the other. The unison ring 22 is translated and tilts to move fairing 24 which pivots the outer flaps 25 of the divergent section 20. The outer flaps 25 are actuated so that the outer flaps 25 on one side of the divergent section 20 are moved to a different angle than those on the other side of the divergent section 20. In this way the direction of the exhaust gases issuing from the nozzle exit 27 can be moved up or down to control the associated aircraft (not shown) in the pitch axis or moved from side to side to control the aircraft in the yaw axis or any combination thereof.

Figure 2:
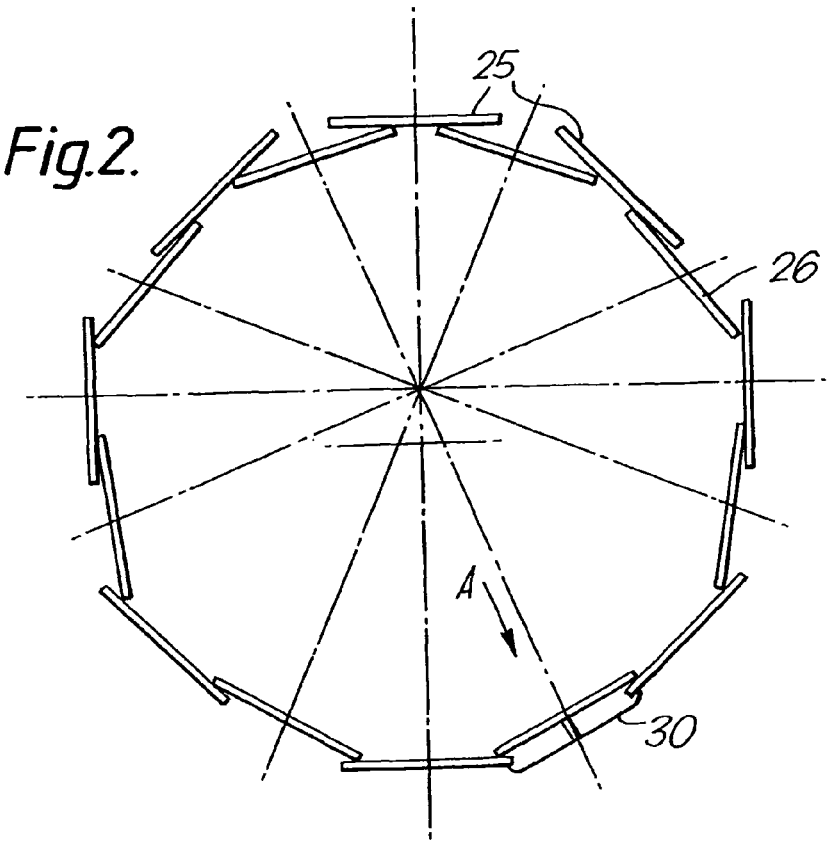
FIG. 2 is a rear view of the nozzle in FIG. 1.

As each of the outer flaps 25 of the divergent section 20 takes up a different angle the inner flaps 26 remain in sealing contact, FIG. 2, by twisting along their lengths. The inner flaps 26 are torsionally flexible along their lengths and this allows the inner flaps 26 to twist along their lengths until they are in sealing contact with adjacent outer flaps 25 which are at different angles. The inner flaps 26 are stiff across their width so that they can withstand the pressure applied on them by the exhaust gases passing therethrough.

Figure 3:
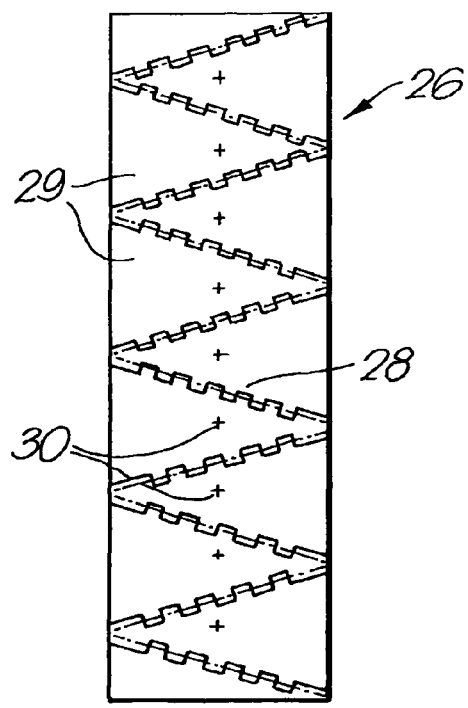
FIG. 3 is a radial view along arrow A in FIG. 2 of one of the radially inner flaps of the nozzle.

The inner flaps 26 are made torsionally flexible by their division into triangular portions 29 interconnected by a series of angled hinges. The hinge axes are indicated by the broken lines 28 in FIG. 3. The angled hinges may be one piece springs as each hinge has only to move through a small angle. The triangular portions 29 are alternated to give the inner flap 26 its rectangular shape. Each triangular portion 29 has its own retainer 30 to keep it in contact with the outer flaps 25 when there are no exhaust gases flowing therethrough. The retainer 30 may be a spring or some other similar device.

It will be appreciated that although the arrangement described uses actuators on the outer flaps 16 and 25 of the convergent 14 and divergent 20 sections respectively to operate them independently of one another it would be less complicated to link the convergent section 14 and divergent section 20 together so they are operated by the same actuators. Alternatively the outer flaps 25 of the divergent section 20 could move freely in response to the pressure loads acting on them.

Although the present invention has been described with reference to a convergent/divergent nozzle it will be appreciated by one skilled in the art that it is equally applicable to any nozzle where a number of radially outer and inner flaps are used and which need to be maintained in sealing contact. For example the invention could be used in propulsion nozzles which only have a single section, each of the outer and inner flaps in this section being convergent at their upstream ends and divergent at their downstream ends.

I claim:

1. An exhaust nozzle for a gas turbine engine capable of vectoring a flow of exhaust gases issuing therefrom at an angle to a centre line of the engine, the exhaust nozzle comprising a plurality of radially outer and radially inner flaps circumferentially disposed around the engine, the radially outer and radially inner flaps overlapping each other alternately to define a flow path through which the exhaust gases flow, means for moving the radially outer flaps asymmetrically about the engine centre line being provided, the radially inner flaps being urged into sealing contact with the radially outer flaps by the exhaust gas flowing through the nozzle, each of the radially inner flaps being divided into a plurality of triangular sections, so it is torsionally flexible so as to allow it to twist along its length, whereby sealing contact is maintained with the radially outer flaps when the radially outer flaps are moved asymmetrically.

2. An exhaust nozzle as claimed in claim 1 in which the triangular sections of the radially inner flaps are interconnected by hinges.

3. An exhaust nozzle as claimed in claim 1 in which the radially outer flaps are moved asymmetrically with respect to the engine centre line by linear actuators which are connected to the flaps by a unison ring.

4. An exhaust nozzle as claimed in claim 1 in which each of the radially outer and radially inner flaps has a convergent and divergent section.

5. An exhaust nozzle as claimed in claim 4 in which the convergent and divergent sections of the radially outer and radially inner flaps are joined together by hinges.

6. An exhaust nozzle as claimed in claim 1 in which the nozzle is provided with an outer fairing.

* * * * *